United States Patent [19]

Hayashida et al.

[11] Patent Number: 4,801,037
[45] Date of Patent: Jan. 31, 1989

[54] OPENING/CLOSING DEVICE FOR A MOUTH OF A CONTAINER AND PROCESS FOR MAKING THE SAME

[75] Inventors: Mitsuharu Hayashida, Nara; Kazuo Sasaki, Tokyo; Nobusige Yasui, Tokyo; Eiji Takahashi, Tokyo, all of Japan

[73] Assignees: Mikasa Sangyo Kabushiki Kaisha, Nara; Jujo Paper Co., Ltd., Tokyo, both of Japan

[21] Appl. No.: 126,843

[22] Filed: Nov. 30, 1987

[51] Int. Cl.⁴ ............................................. B65D 41/62
[52] U.S. Cl. ................................. 220/259; 215/232; 220/359; 229/125.08; 229/125.15; 229/125.33; 53/478; 156/69
[58] Field of Search .................. 220/259, 359; 229/125.08, 125.13, 125.15, 125.33; 215/232; 53/478; 156/69

[56] References Cited

U.S. PATENT DOCUMENTS 3,391,847 7/1968 Christine et al. ............... 220/359 X
3,561,668 2/1971 Bergstrom ........................ 220/359 X
3,671,356 6/1972 Keinanen ............................... 156/69

Primary Examiner—Donald F. Norton
Attorney, Agent, or Firm—Price, Heneveld, Cooper, DeWitt & Litton

[57] ABSTRACT

As opening/closing device to be provided at a mouth of a container such as a paper container, a bottle, a can, etc., in which a lid is provided via a hinge on the inside of a cylindrical pouring mouth made of synthetic resin and a gap space is formed between the pouring mouth and the lid. A metallic film consisting of a metal foil having synthetic resin layers coated on its both surfaces is bonded so as to straddle both the upper surface of the lid and the upper surface of the pouring mouth. Opening of the lid is effected by peeling of the metallic film, and upon closing the lid, the metallic film is pressed from its outer surface so that it may be stuffed in the gap space between the lid and the pouring mouth. Upon making the opening/closing device, an annular protrusion is formed on the top end surface of the pouring mouth, the metallic film is bonded to this annular protrusion and the lid so that the metallic film may be easily peeled off.

3 Claims, 4 Drawing Sheets

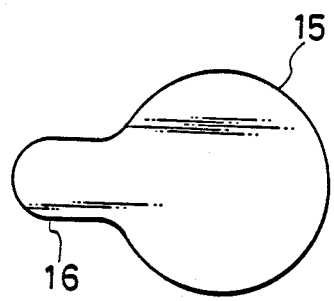
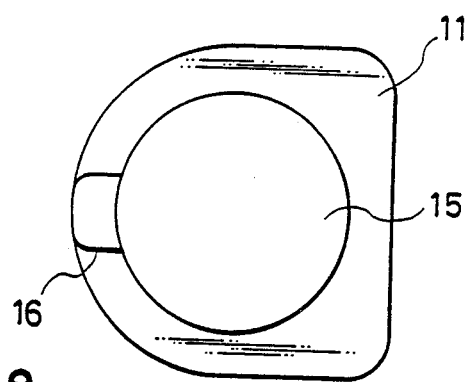
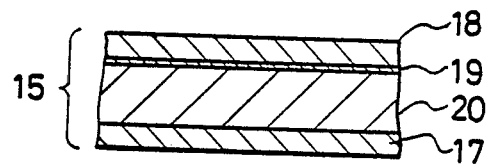
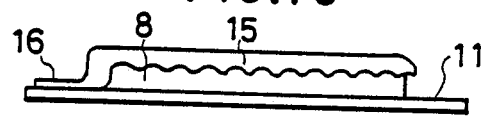
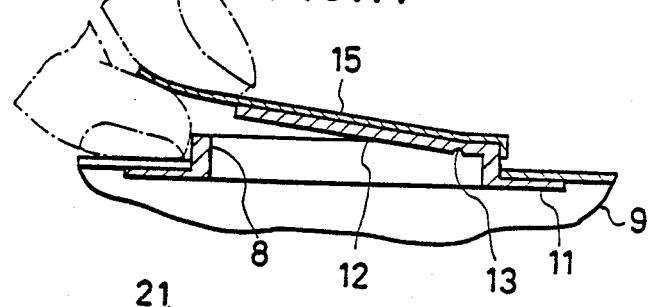
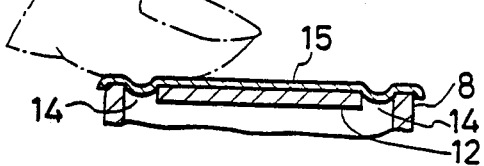

OPENING/CLOSING DEVICE FOR A MOUTH OF A CONTAINER AND PROCESS FOR MAKING THE SAME

BACKGROUND OF THE INVENTION

1. Field of the Invention

The present invention relates to an opening/closing device for a mouth of a container such as a paper container, a can, a bottle or the like, and a process for making the same.

2. Description of the Prior Art

The inventor of this invention invented previously the above-mentioned type of device as shown in FIGS. 19 to 21, and a Utility Model application was filed therefor and laid open at the Japanese Patent Office (Japanese Utility Model Application No. 60-161811(1985)).

The present invention relates to improvements for the above-referred laid-open invention, and so, at first description will be made on the above-referred laid-open invention.

In FIGS. 19 to 21, reference numeral 51 designates a mount portion, numeral 52 designates a pouring mouth, numeral 53 designates a hinge and numeral 54 designates a lid. The entire assembly is formed of synthetic resin. Reference numeral 55 designates a gap space for improving a hinge effect. In addition, a metallic film 56 is made to adhere onto the upper surface of the assembly, that is, onto the upper surface of the lid 54 and the upper surface of the pouring mouth 52. By way of example, this metallic film 56 consists of an aluminium foil with synthetic resin layers (not shown) formed on both of its surfaces. The lid 54 is formed so as to have a slightly larger diameter than the pouring mouth 52.

The above-mentioned device is mounted on a paper container or the like. It is to be noted that in FIGS. 19 and 21, reference numeral 57 designates a nip portion of the metallic film 56. A user of a container 58 nips portion 57 and pulls it in the direction of arrow A57 to open the lid 54, and thereby he can pour out the liquid in the container 58. For instance, this device is provided on a paper container containing milk, and when the device is opened to drink a part of the milk and then the residual is accommodated in a refrigerator or the like, the device can be closed in a simple manner by pushing the lid 54 from the outside into the pouring mouth 52.

However, in such a device, since the lid 54 is formed so as to have a larger diameter then the pouring mouth 52, although only slightly, it is somewhat difficult to push the lid 54 into the pouring mouth 52, and it necessitates some effort. Consequently, in some cases the device is used with the lid 54 not perfectly pushed into the pouring mouth although it is pushed in the desired direction, and in such cases there is a fear that floating dust and dirt in the atmosphere may possibly enter the container through the pouring mouth.

Furthermore, it was discovered that the above-mentioned laid-open device involved problems also with respect to the process for making the same. That is, in the case of thermally bonding the metallic film 56 onto the upper surface of the pouring mouth 52, a support table not shown is applied to the lower surface of the lid 54 and the metallic film 56 is pressed from above while it is being heated by means of a heating plate not shown, but it is impossible to press the upper surfaces of the lid 54 and the pouring mouth 52, respectively, with favourable pressures because the pressing is effected for both the upper surfaces of the lid 54 and the pouring mouth 52 in one action. Consequently, the metallic film 56 would be strongly bonded to the upper surface of the pouring mouth 52, resulting in the problem that upon use the metallic film 56 can be hardly pealed from the pouring mouth 52. This is caused also for the following reasons. That is, in Japan, synthetic resin to be used on the inside of a paper container or the like for containing milk is limited to polyethylene, and in the event that the pouring mouth 52 and the inner surface coating of the metallic film 56 are both made of polyethylene, they would be more strongly bonded because of the same kind of resin.

The present invention has been made for the purpose of resolving this problem, and one object of the present invention is to provide an opening/closing device for the mouth of a container, which can very easily close a pouring mouth upon reuse of the device after initial opening thereof, by improving the above-referred laid-open opening/closing device. In addition, another object of the invention is to provide a process for making the above-described opening/closing device including the step of pressing and heating a pouring mouth 52 and a lid 54 from the side of a surface of a metallic film 56 in one action, in which the metallic film 56 can be thermally bonded to the pouring mouth 52 so that the bonded metallic film 56 can be easily peeled off.

SUMMARY OF THE INVENTION

Now describing an opening/closing device for a mouth of a container according to the present invention which can achieve the above-mentioned object, it is an opening/closing device for the mouth of a container characterized in that it comprises a cylindrical pouring mouth made of synthetic resin and having a mount portion for mounting it to the mouth of the container, a lid provided integrally via a hinge on a part of the inside of the pouring mouth, a gap space formed between the lid and the inner surface of the pouring mouth along the entire circumference except for the hinge, and a metallic film bonded so as to straddle both the upper surface of the lid and the upper surface of the pouring mouth, provided with a nip portion and including a metal foil with synthetic resin layers coated on its both surfaces.

In addition, as a process for making the above-described opening/closing device for the mouth of a container, the present invention provides a process for making an opening/closing device for a mouth of a container characterized in that an annular protrusion is provided on a top surface of a pouring mouth made of synthetic resin, having a mount portion for mounting it to the mouth of the container, shaped in a cylindrical form, and including a lid provided integrally via a hinge on the inside of the pouring mouth. A support table is positioned on the inside of the lid, a metallic film including a metal foil with synthetic resin layers coated on its both surfaces is positioned so as to straddle both the surface of the protrusion and the surface of the lid, and the metallic film is thermally bonded to the protrusion and the lid by heating and pressing it.

BRIEF DESCRIPTION OF THE DRAWINGS

FIG. 7 is a plan view of a metallic film to be used in the same opening/closing device;

FIG. 8 is a plan view of the same opening/closing device;

FIG. 9 is an enlarged partial cross-section view of a metallic film to be used in the same opening/closing device;

FIG. 10 is a side view of the same opening/closing device;

FIG. 11 is a schematic view for explaining an operation upon opening of the same opening/closing device;

FIG. 12 is a schematic view for explaining an operation upon closing of the same opening/closing device;

DESCRIPTION OF THE PREFERRED EMBODIMENTS

Figure 1:
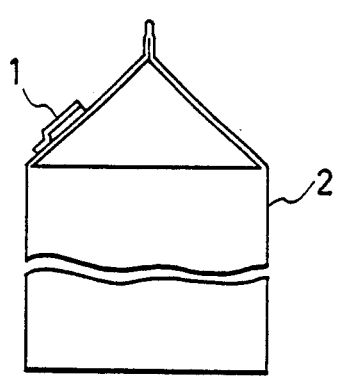
FIG. 1 is a side view of a paper container provided with an opening/closing device for the mouth of a container according to the present invention.
Figure 2:
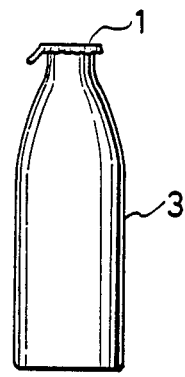
FIG. 2 is a side view of a bottle provided with an opening/closing device for the mouth of a container according to the present invention.
Figure 3:
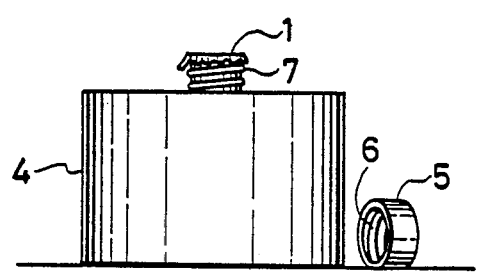
FIG. 3 is a side view of a bottle provided with an opening/closing device for the mouth of a container according to the present invention.
Figure 4:
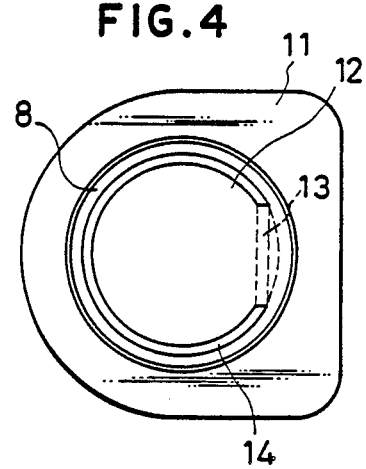
FIG. 4 is a bottom view of an opening/closing device according to the present inventin.
Figure 5:
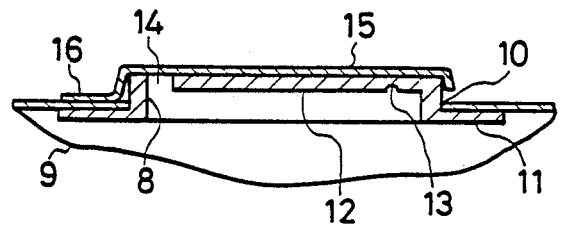
FIG. 5 is a cross-section side view of the same device.
Figure 6:
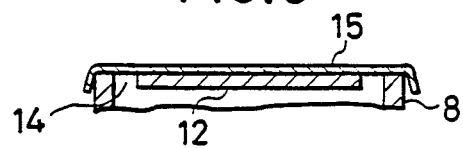
FIG. 6 is a cross-section front view of the same device.

In FIGS. 1 to 3, reference numeral 1 designates opening/closing devices for the mouth of a container, which are provided respectively on a paper container 2, a bottle 3 and a can 4. It is to be noted that while the opening/closing device according to the present invention is employed in the illustrated state in these cases, in addition thereto an outer cap 5 made of synthetic resin as shown in FIG. 3 could be used. Reference numerals 6 and 7 designate screw threads. In FIGS. 4 to 6, reference numeral 8 designates a cylindrical pouring mouth which is made of synthetic resin such as, for example, polyethylene and which has a mount portion 11 to be mounted to a mouth 10 of a container 9. It is to be noted that although this mount portion 11 is formed in a flange shape, in the case of mounting a pouring mouth onto a bottle or the like, a pouring mouth is formed of an inner cylinder and an outer cylinder integrated in a coaxial manner, and the pouring mouth is mounted by pinching a mouth portion of a bottle between the inner and outer cylinders, although the illustration is omitted. Or else, in the case of making the bottle 3 of plastics or the like, the mount portion 11 could be formed integrally with the mouth portion of the bottle.

Reference numeral 12 designates a lid which is integrally provided at a part of the inside of the pouring mouth 8 via a hinge 13. It is to be noted that by forming a groove on the inside of the hinge 13 it is formed in such manner that it may be easily bent upwards but hardly bent downwards. Reference numeral 14 designates a gap space, and numeral 15 designates a metallic film. This metallic film 15 has a nip portion 16 as shown in FIG. 7 and has synthetic resin layers 17 and 18 on its opposite surfaces as shown in FIG. 9. This synthetic resin layer 17 is made of, for example, polyethylene, while the synthetic resin layer 18 is made of resin that is relatively rigid, for instance, polyethylene terephthalate. Reference numeral 19 designates an adhesive layer, and numeral 20 designates a metal foil which is formed of, for example, an aluminum foil.

When a user uses this opening/closing device, he nips the nip portion 16, pulls it up as shown in FIG. 11, thereby the metallic film 15 is peeled from the pouring mouth 8, the lid 12 is opened as bent at the hinge 13, and then the contents in the container 9 is poured out to be served for drinking.

When the contents still remain in the container and are to be reserved, as shown in FIG. 12 the lid 12 is closed as accommodated within the pouring mouth 8, and the portion of the upper surface of the metallic film 15 corresponding to the gap space 14 is pressed by a finger 21 or the like. Then the metallic film 15 enters into the gap space 14 while being deformed partly as shown in FIG. 12. This deformed portion fills the gap space 14 so as to sealingly close the gap space, and also the deformation of the metallic film 15 can be maintained by the gap space 14. In other words, only by the simple operation of merely pressing with a finger 21, the pouring mouth 8 can be sealingly closed in a favorable manner.

Figure 13:
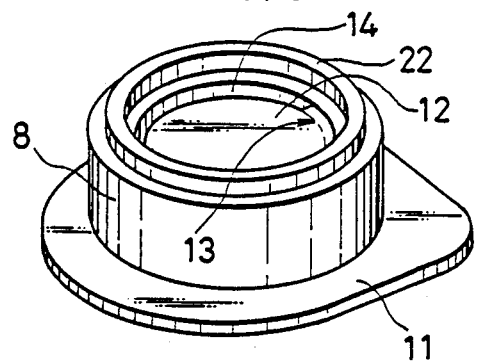
FIG. 13 is a perspective view of a part of an opening/closing device according to the present invention.
Figure 14:
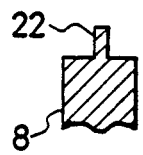
FIGS. 14 to 16, respectively, are cross-section views of top end portions of various types of pouring mouths.
Figure 15:
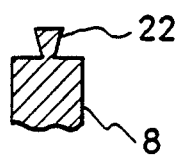
Figure 16:
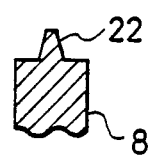
Figure 17:
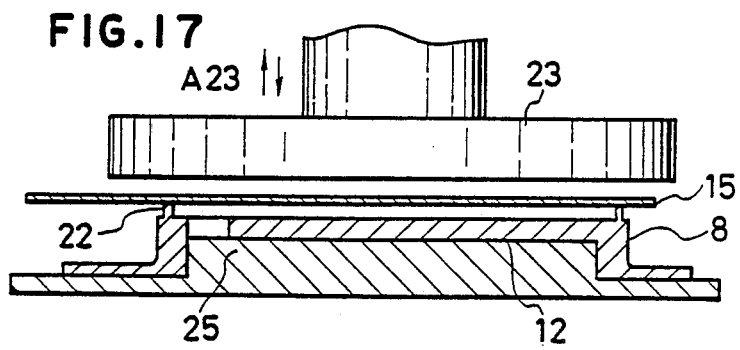
FIG. 17 is a schematic view for explaining an operation for thermally bonding a metallic film onto a pouring mouth.
Figure 18:
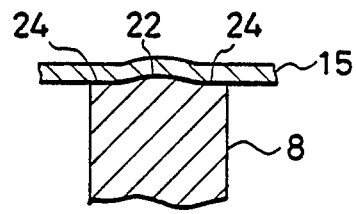
FIG. 18 is a cross-section view of a top end portion of a pouring mouth after a metallic film has been thermally bonded thereto.
Figure 19:
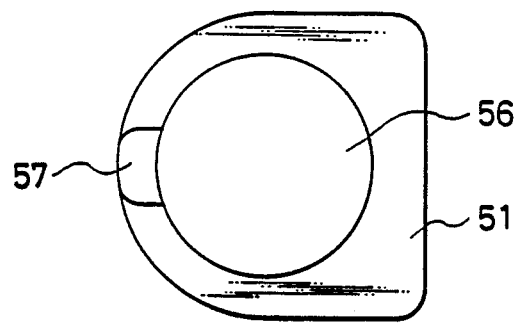
FIG. 19 is a plan view of a similar type of opening/closing device for the mouth of a container according to a prior invention for which Japanese patent application was filed previously by the inventor of this application and was laid open.
Figure 20:
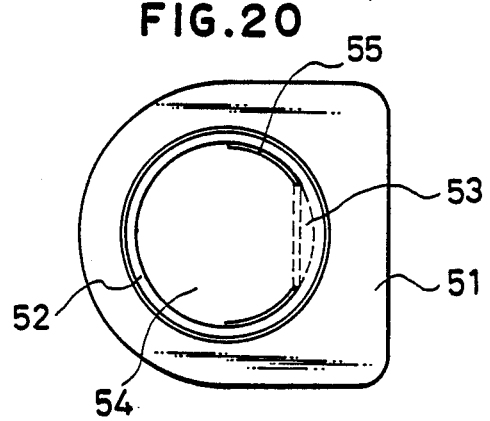
FIG. 20 is a bottom view of the same device.
Figure 21:
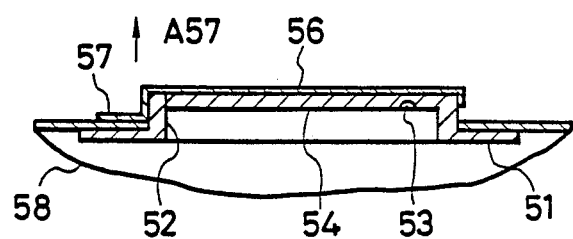
FIG. 21 is a cross-section side view of the same device.

With reference to FIG. 13, an annular protrusion 22 is provided integrally on a top end surface of a pouring mouth 8. This protrusion 22 could be formed to have various different cross sectional configurations as shown in FIGS. 14 to 16. In FIG. 17, reference numeral 23 designates a heating plate made of metal which can be reciprocated in the direction of arrows A23, and thereby a metallic film 15 can be pressed and heated so that it may be thermally bonded to both the lid 12 and the pouring mouth 8. At this instance, the above-mentioned protrusion 22 would be molten and would deform nearly as shown in FIG. 18. Consequently, the portion of the top end of the pouring mouth 8 in the proximity of the protrusion 22 is thermally bonded relatively strongly to the metallic film 15 and the other portion 24 is thermally bonded relatively weakly. Therefore, upon use the metallic film 15 can be easily peeled off. As described above, owing to the fact that the annular protrusion 22 is provided on the top end surface of the pouring mouth 8, even if both the lid 12 and the pouring mouth 8 are thermally bonded to the metallic film 15 at the same time, they can be thermally bonded in such manner that upon use the metallic film 15 can be very easily peeled from the pouring mouth 8. In this connection, it is a matter of course that with regard to the heating plate 23, in place of the heating plate a welder section in a high frequency welder, a supersonic welder or the like could be employed. In FIG. 17, reference numeral 25 designates a support table.

What is claimed is:

1. An opening/closing device for a mouth of a container characterized in that said device comprises a cylindrical pouring mouth made of synthetic resin and having a mount portion for mounting it to the mouth of the container, a lid provided integrally via a hinge on a part of the inside of said pouring mouth, a gap space formed between said lid and the inner surface of said pouring mouth along the entire circumference except for said hinge, and a metallic film bonded to the upper surface of said pouring mouth and to said lid so as to straddle both the upper surface of said lid and the upper surface of said pouring mouth, provided with a nip portion and including a metal foil with synthetic resin layers coated on its both surfaces.

2. A process for making an opening/closing device for a mouth of a container; characterized by the steps of forming a mount portion with an annular protrusion on a top end surface forming a pouring mouth made of synthetic resin, said mount portion having a peripheral portion for mounting the pouring mouth to the mouth of the container, said pouring mouth being shaped in a cylindrical form and including a lid provided integrally via a hinge on the inside of the pouring mouth; positioning a support table on the inside of said lid; positioning a metallic film including a metal foil with synthetic resin layers coated on its both surfaces, so as to straddle both the surface of said protrusion and the surface of said lid; and thermally bonding said metallic film to said protrusion and said lid by heating and pressing it against said protrusion and lid.

3. A method for opening and closing a mouth of a container; characterized by the steps of providing a lid integrally via a hinge on a part of an inside of a cylindrical pouring mouth made of synthetic resin and having a mount portion; forming a gap space between said lid and said pouring mouth; providing a metallic film having a nip portion and having synthetic resin layers coated on its bottom surface for bonding it to the upper surface of said lid and the top of the pouring mouth; closing said pouring mouth by making a part of said metallic film deform and enter into said gap space and become bonded to said lid and said pouring mouth; and opening said lid by nipping said nip portion therefrom and peeling the film from the pouring mouth.

* * * * *